Figure 1:
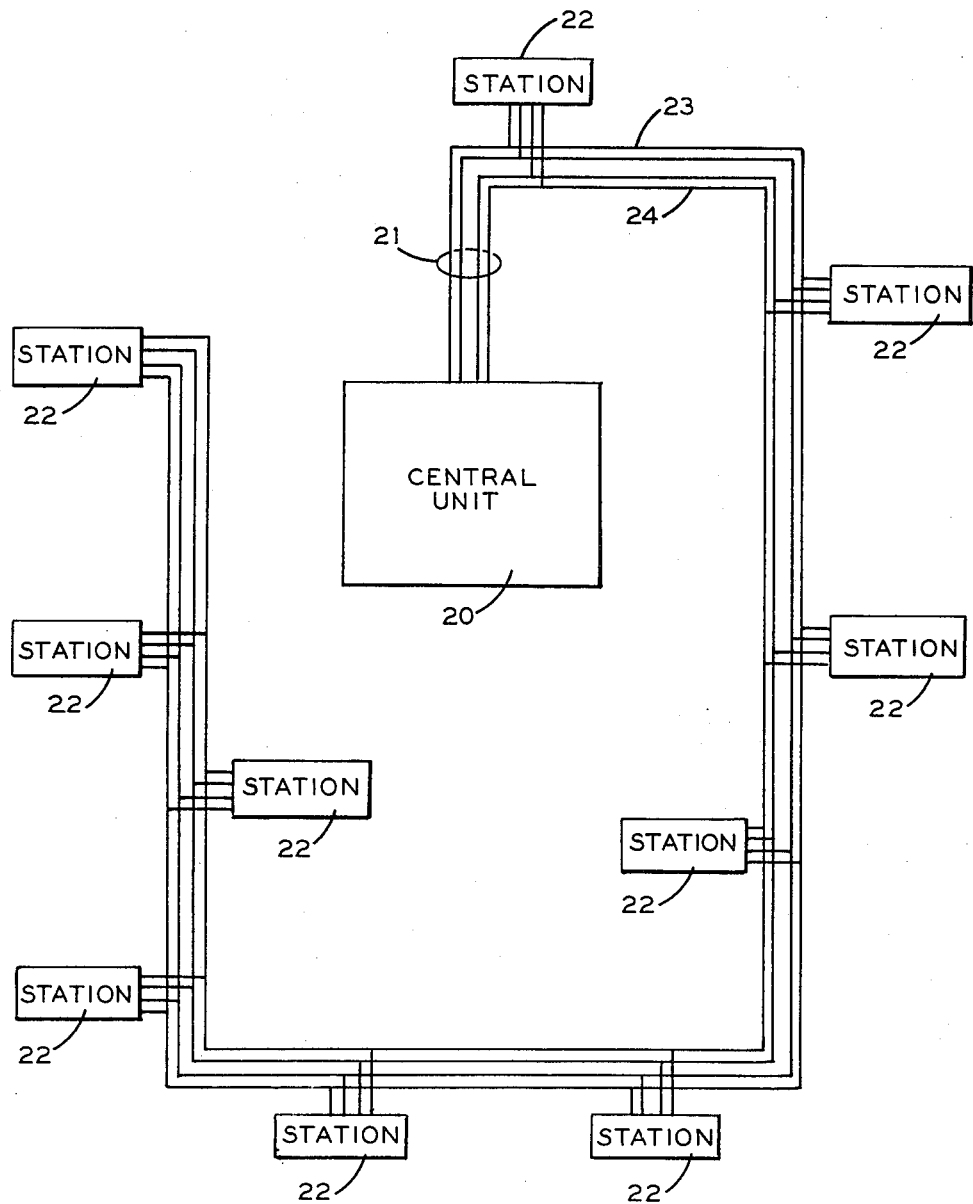

United States Patent
Percher

[15] 3,699,523
[45] Oct. 17, 1972

[54] METHOD AND APPARATUS FOR ADDRESSING DIFFERENT DATA POINTS FROM A CENTRAL STATION

[72] Inventor: Guy Percher, Fresnes, France

[73] Assignee: Societe D'Instrumentation Schlumberger, Paris, France

[22] Filed: April 28, 1970

[21] Appl. No.: 32,686

[30] Foreign Application Priority Data

April 29, 1969 France..................6913553

[52] U.S. Cl..............................340/172.5
[51] Int. Cl. ..............................G08c 19/30
[58] Field of Search .............340/172.5; 343/5, 7.5

[56] References Cited

UNITED STATES PATENTS

| | | | |
|---|---|---|---|
| 3,369,239 | 2/1968 | Perkinson et al. | 343/7.5 X |
| 3,509,539 | 4/1970 | Fichter et al. | 340/172.5 |
| 3,512,139 | 5/1970 | Reynolds, Jr. et al. | 340/172.5 |
| 3,516,072 | 6/1970 | Wallace, Jr. | 340/172.5 |
| 3,528,060 | 9/1970 | Streif | 340/172.5 |
| 3,534,337 | 10/1970 | Martin et al. | 340/172.5 |
| 3,537,075 | 10/1970 | Anderson et al. | 340/172.5 |

*Primary Examiner*—Paul J. Henon
*Assistant Examiner*—Paul R. Woods
*Attorney*—William R. Sherman, Stewart F. Moore and Jerry M. Presson

[57] ABSTRACT

Disclosed is a method of and system for addressing plural data points variously located throughout an industrial installation or process from a central unit. The data points are grouped in stations which discriminate between a plurality of signal translating channels, for example, seven. The selection of any given data point is performed in two phases: addressing or selecting a station by transmitting from the central unit a combination of, for example, four channel signals selected from the exemplary seven channels, followed by addressing or selecting the given point by transmitting a combination of a lesser number, for example, three channel signals also selected from the exemplary seven channels. The data from the addressed point may be transmitted to the central unit either in digital form or as a frequency-modulated signal and/or the addressed point may serve as a control for a process. Both the central unit and the data points may be transceivers and communications therebetween may be transmitted by various suitable media.

14 Claims, 12 Drawing Figures

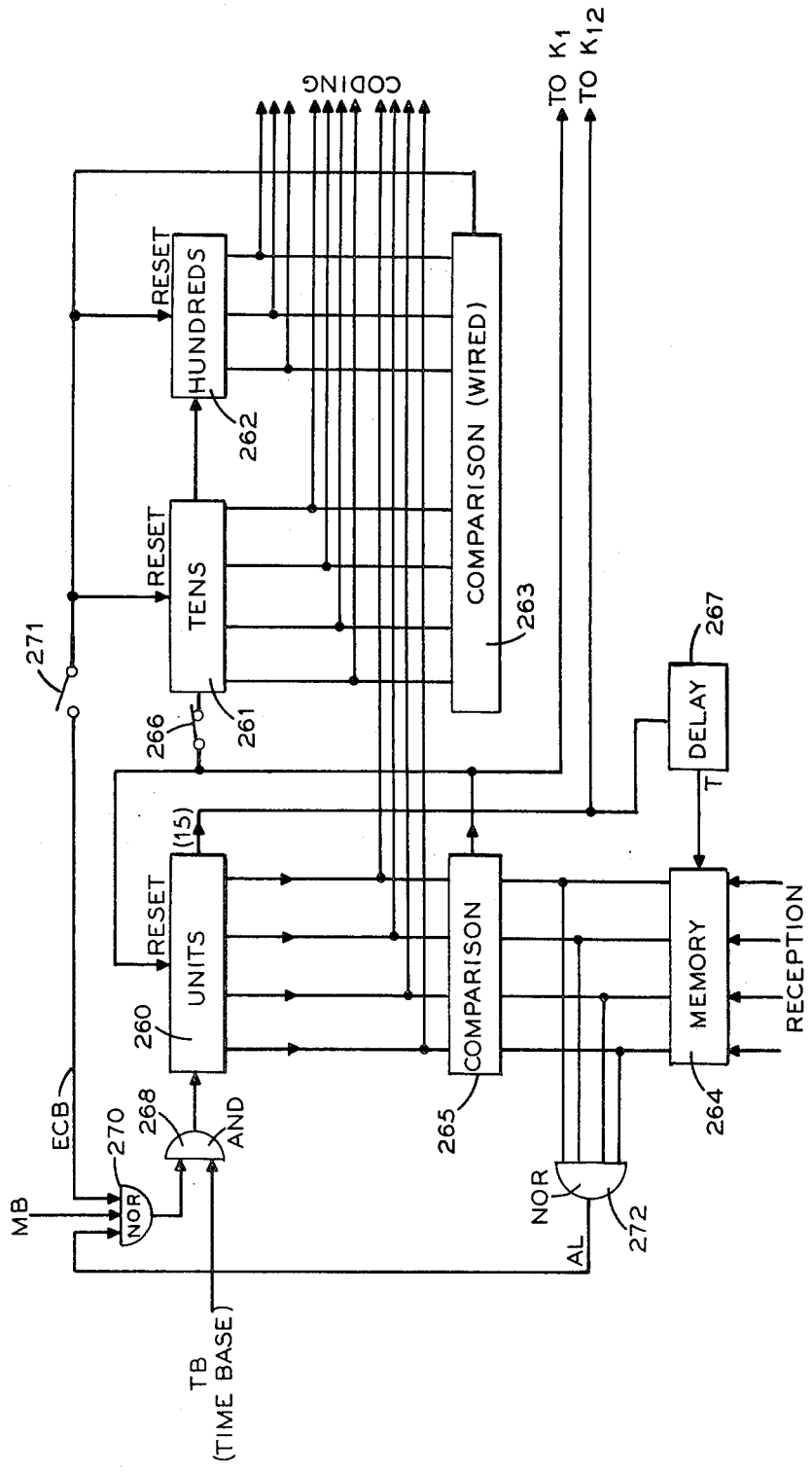

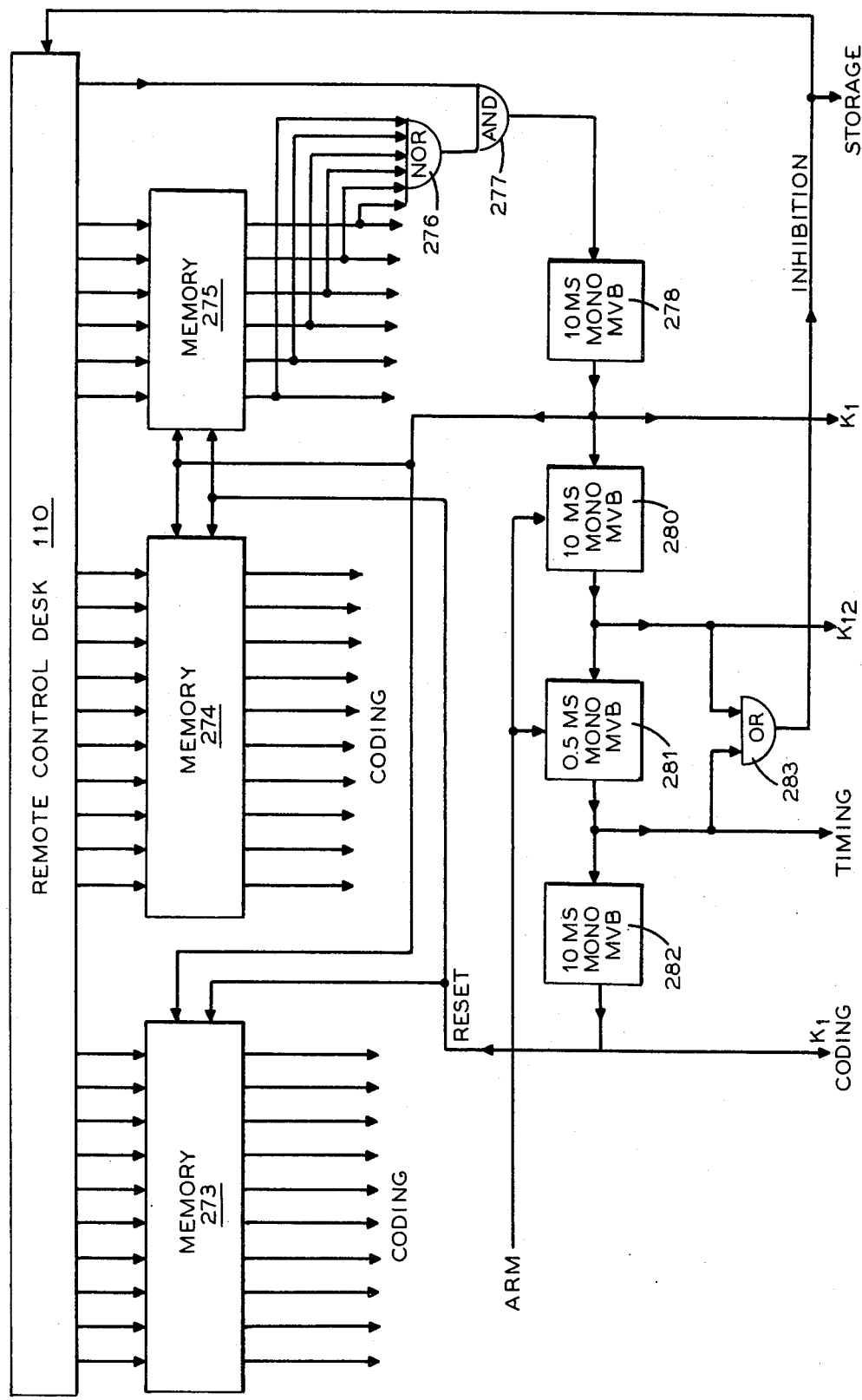
FIG. 9 REMOTE CONTROL

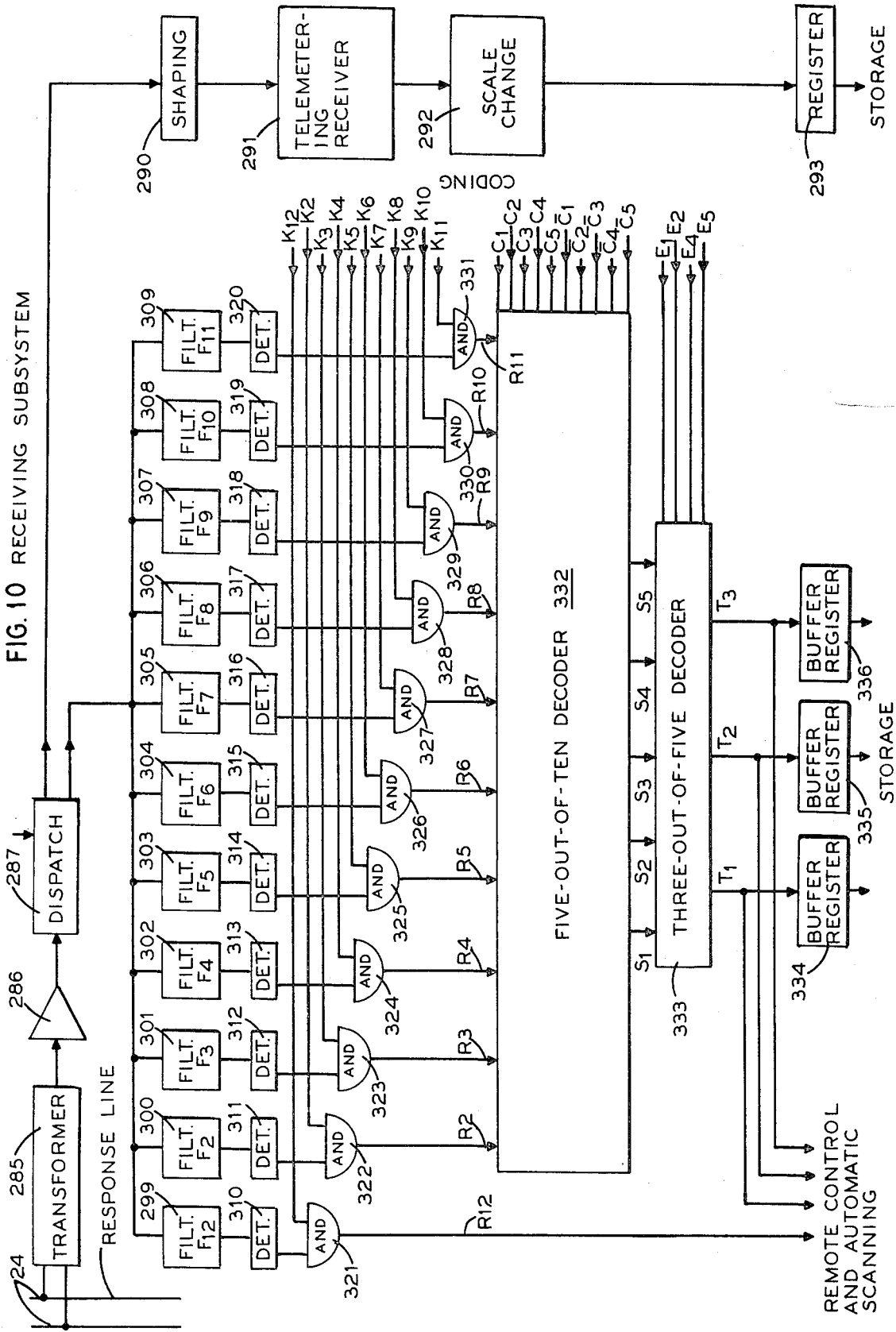

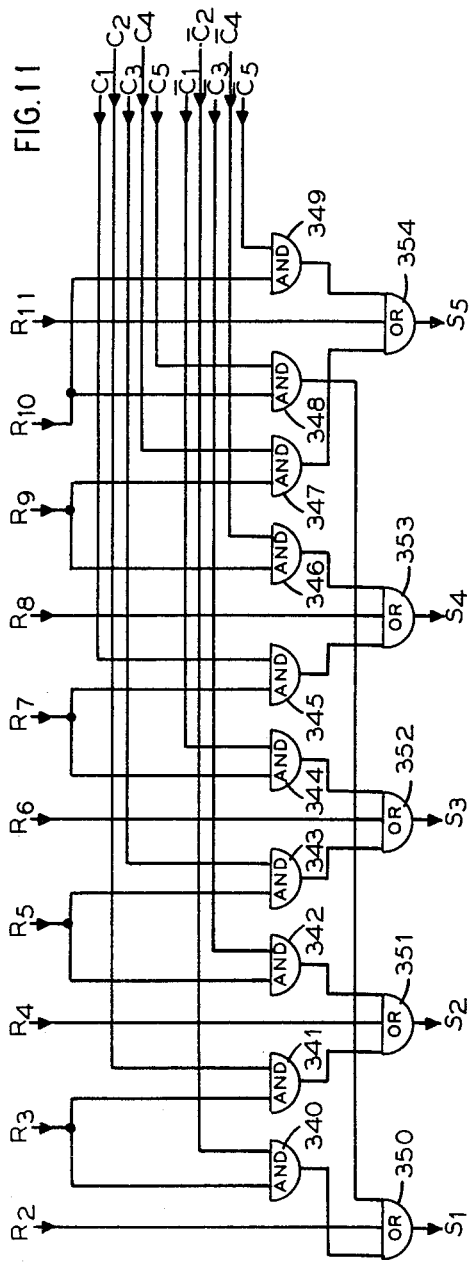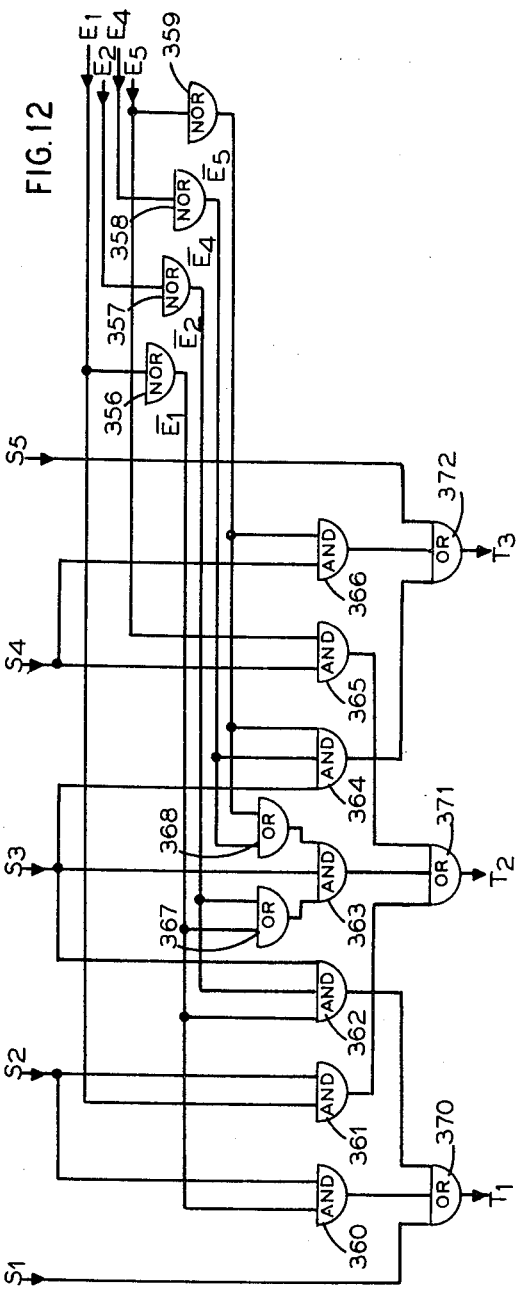

METHOD AND APPARATUS FOR ADDRESSING DIFFERENT DATA POINTS FROM A CENTRAL STATION

The invention relates to the methods and systems for transmitting data and more particularly to a method and system for permitting the centralization of measurements and controls utilized for the control of an industrial process.

In most industrial processes, a production line for example, the entire system is monitored by measurements or indications carried out at different points. It is also possible, from this information, to modify the operation of the process by means of a certain number of controls. The purpose of the data transmission system according to the invention is to group at a central station the different measurements, indications and controls.

The principle used consists of selectively interrogating the different points which only send data, in the form of quantitative measurements of "on-off" type indications, when they are called. It is possible, with this technique, to cut down considerably the total length of transmission cables by connecting all the points to the central unit through a signal telephone line incorporating, for example, one pair of call conductors and one pair of response conductors.

For the interrogation, one transmits, on the call line, according to a principle known in telephony, a combination of signals of different frequencies selected from among several possible channels. To a given combination of frequencies there corresponds a particular measuring point which is then connected to the response line.

Each point includes a certain number of filters each of which is tuned to one of the channels, the choice of the filters for a given point corresponding to the combination of frequencies which constitutes its address.

One drawback of such an interrogation system is that it has only a relatively small capacity of points due to the limited number of possible addresses. In fact, if we assume, by way of example, that there are 12 channels and that combinations of three frequencies are used, there will be a limit of $C_3^{12}$ addresses, that is, 220 points. Moreover, the total number of filters required is typically very large, 3 × 220, i.e., 660 in the above example, which leads to a high cost price for the system.

It is an object of the instant invention to provide a method and system for centralizing the gathering of data from a relatively large number of data producing points capable of carrying out measurements, indications, controls or other functions.

The invention also has as an object a data transmission system in which the cost of the elements external to the central unit is very low.

According to one embodiment of the instant invention, a method and system is disclosed for centralizing the process of obtaining data from different data-producing points of an industrial process, of the type in which a central unit selectively interrogates each of the said points by transmitting thereto a combination of $p$ dominant frequencies selected from among a number of channels of predetermined dominant frequencies. The points are grouped or arranged in stations and each station employs a small number $n$ of filters permitting the discrimination of n of the frequency channels. The selection of a certain data point is carried out in two phases. The first phase involves the selection of a station by the transmission of at least $(p + 1)$ predetermined signal frequencies chosen from the said $n$ channel frequencies and the second phase involves selecting the desired data by the transmission of the $p$ signal frequencies also chosen from said n channel frequencies.

According to another embodiment of the invention, the $p$ signal frequencies used for calling a certain point are or are not sent back on a response line connected to the central unit depending on the state of $p$ bistable indicating means associated with that point.

According to still another embodiment of the invention, an analog measurement may be carried out at certain of the said points and transmitted to the central unit in the form of a frequency-modulated signal at the time of the reception of the combination of the $p$ call signals by the point.

According to a further embodiment of the invention, a control may be actuated at each of the said points by transmitting, on the call line, the said combination of $p$ frequencies, this transmission being carried out during a relatively long period of time in comparison with the call of the said point so as to be differentiated from that call.

Figure 2:
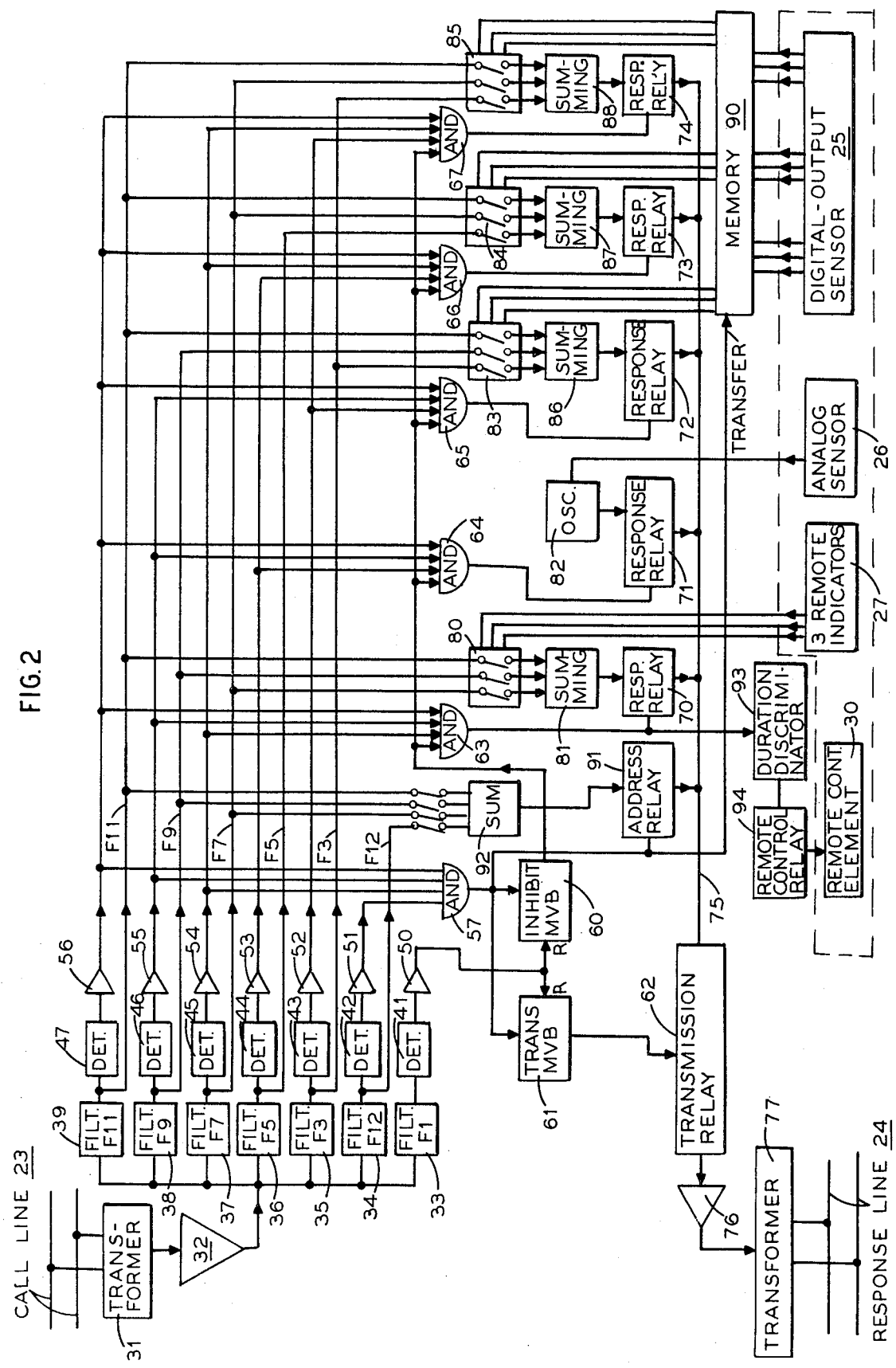
Figure 3:
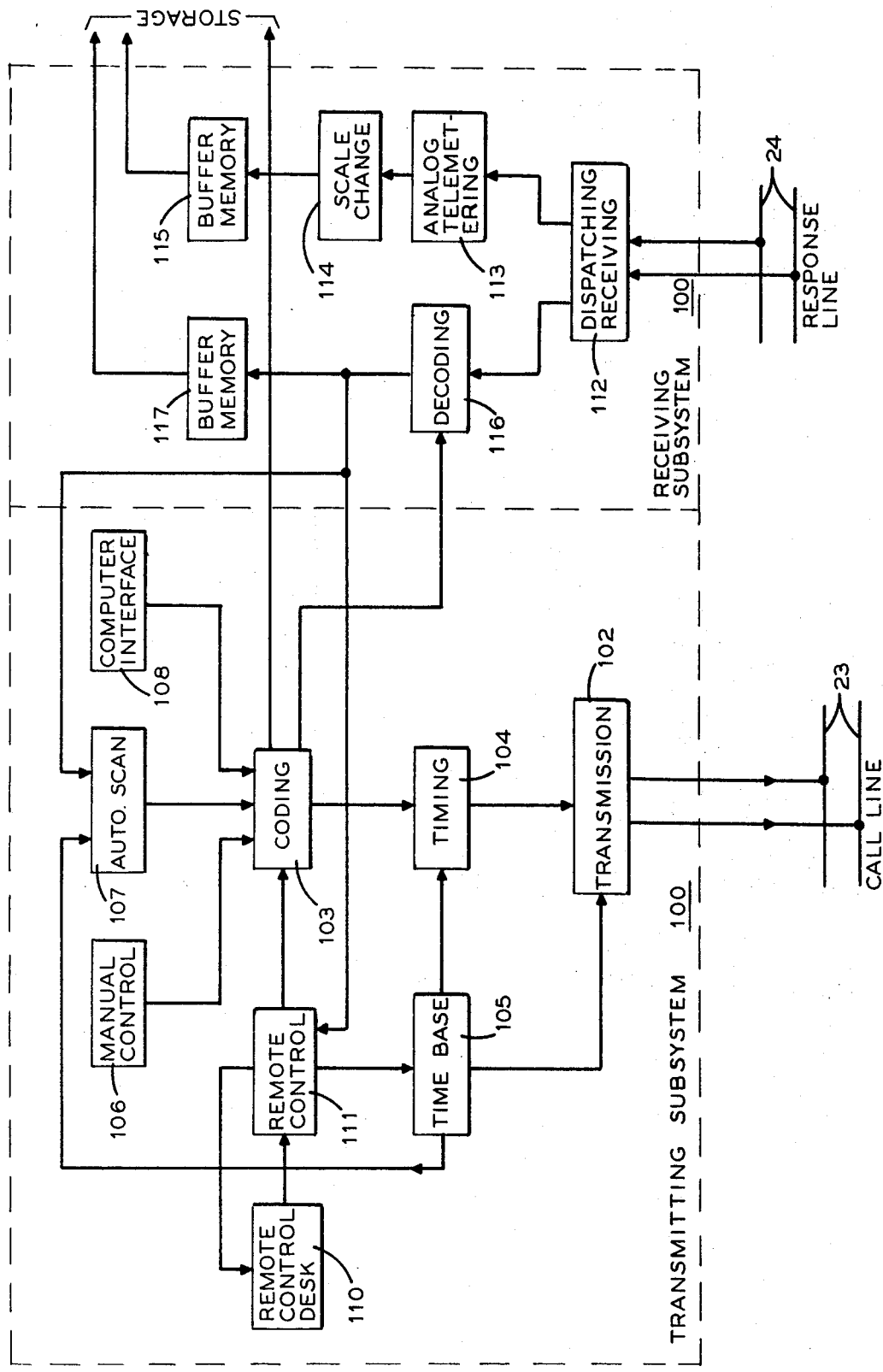
Figure 4:
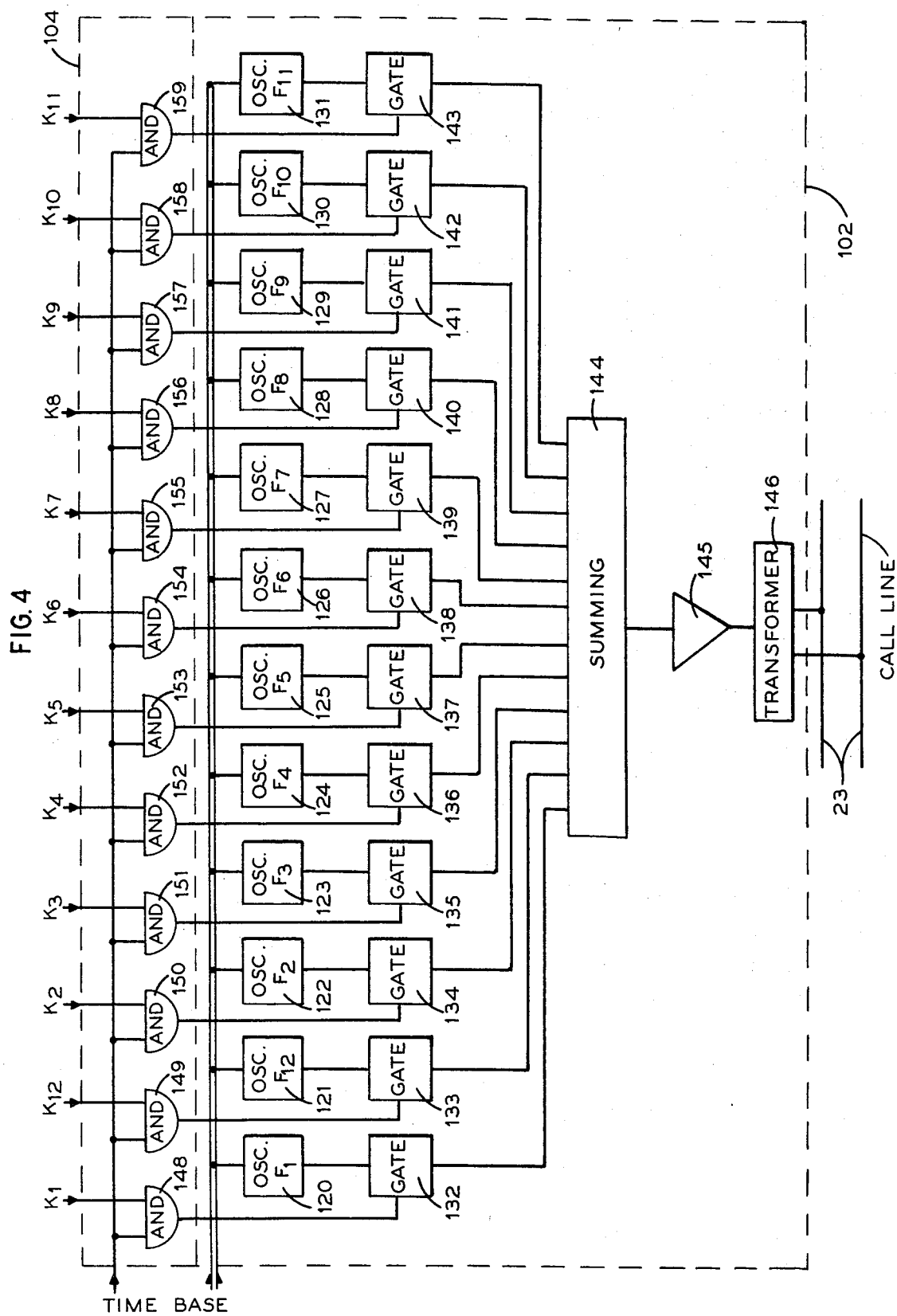
Figure 5:
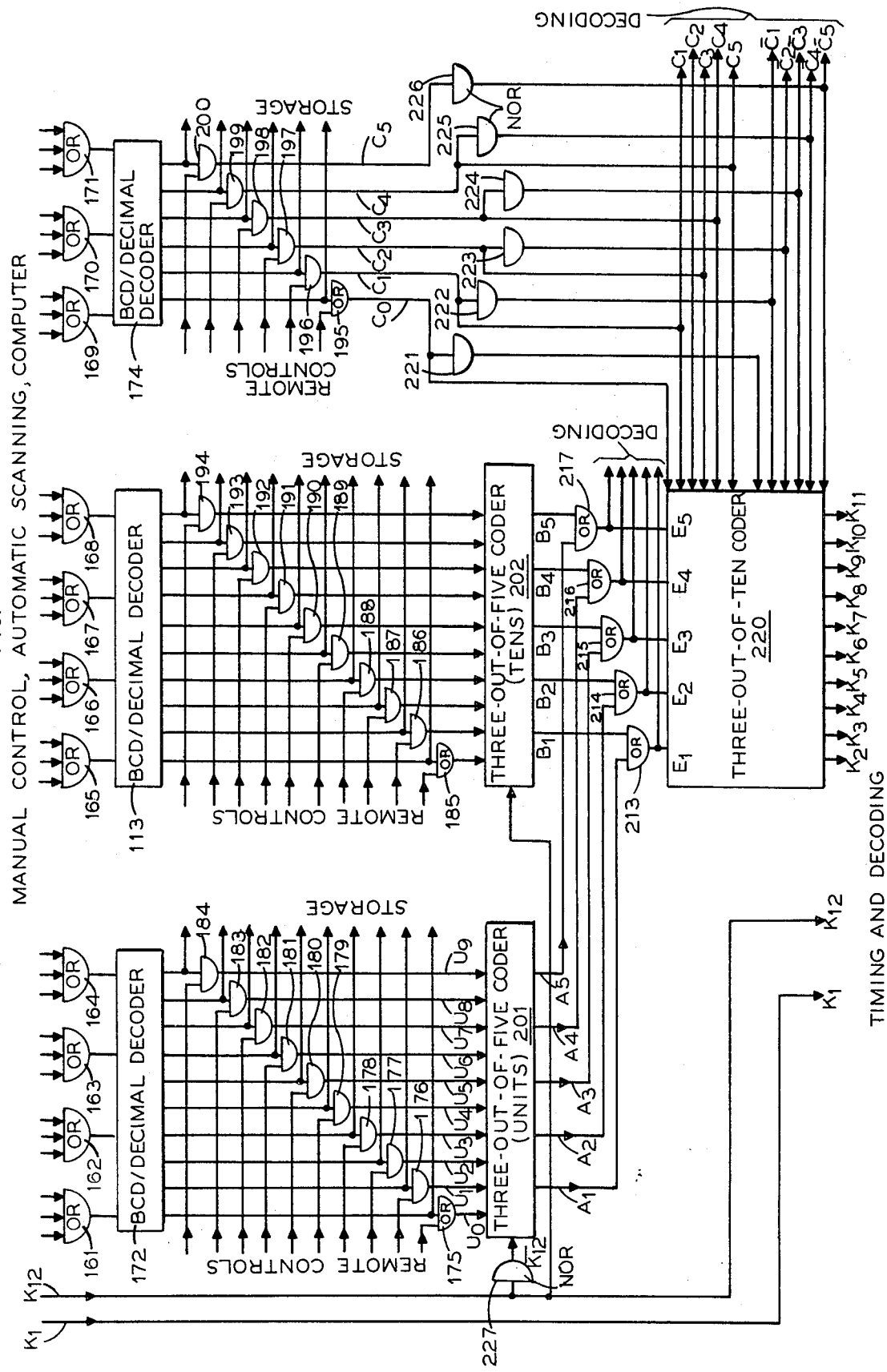
Figure 6:
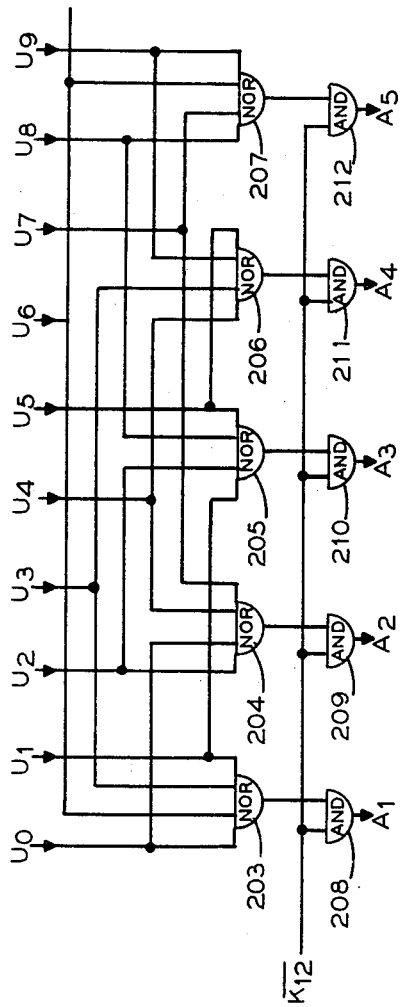
Figure 7:
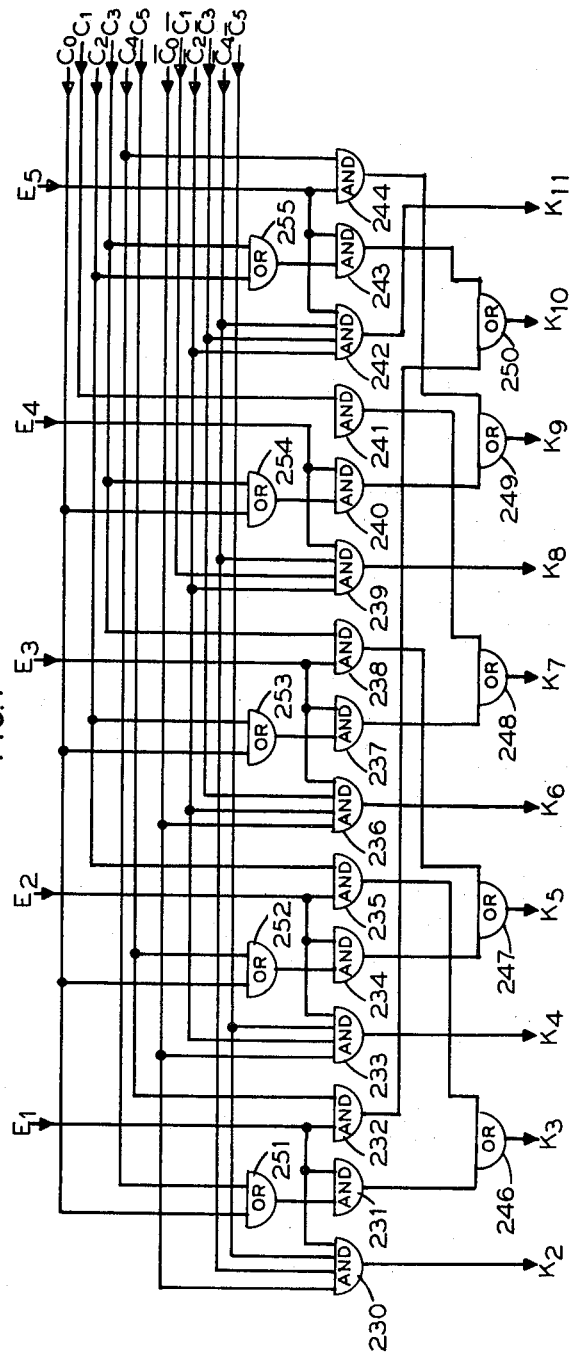

The characteristics and advantages of the invention will be better understood through the description to follow, given by way of example only, with reference to the accompanying drawings wherein:

FIG. 1 is a block diagram of the overall data transmission system constructed according to the invention showing a layout of several stations and a central unit, FIG. 2 is a circuit diagram of one of the peripheral stations of FIG. 1, FIG. 3 is a schematic diagram of the central unit of the system of FIG. 1, FIG. 4. is a diagram of the transmission-timing section of the transmission subsystem of the central unit shown in FIG. 3, FIG. 5 is a more detailed diagram of the coding section of the transmission subsystem of the central unit shown in FIG. 3, FIGS. 6 and 7 are internal circuits of the coding section of FIG. 4, FIG. 8 is a diagram of the automatic scanning module of FIG. 3, FIG. 9 is a diagram of the remote control section of the transmission subsystem of the central unit shown in FIG. 3, FIG. 10 is a diagram of the receiving subsystem of the central unit, FIGS. 11 and 12 are internal circuits of the receiving subsystem of FIG. 10.

BRIEF DESCRIPTION OF OPERATION

Referring to FIG. 1, a data transmission system is composed of a central unit 20 connected by a telephone quad 21 to several stations 22 capable of carrying out measurements, indications and controls at different points of an industrial process. Ten stations are shown in the figure, but they may be of any number, since the capacity of the system, i.e., the total number of stations, is higher as will be seen below. The telephone quad 21 comprises a call line 23 and a response line 24 each having two conductors.

From the operating principle standpoint, twelve channels of different frequencies $F_1$ and $F_{12}$ are available at the central unit. Moreover, each station groups a certain number of data points which acquire or produce desired data or information. Each of these points is associated with a combination of three frequencies representing the call of the point. Likewise, each of the stations is associated with a combination of four frequencies. In order for one of the points to be connected to the response line, it is first of all necessary to send out a combination of four frequencies which selects a station and then a combination of three frequencies which selects the point within the station. The data transmitted by the point may be in the form of an analog signal which is frequency-modulated or coded in digital form. In the latter case, the three frequencies used for calling the point are sent back on the response line, thereby permitting the simultaneous transmission of a three-bit group. The data transmitted by a point may also be composed of three remote indications, the presence or absence of each frequency corresponding to the open or closed state of an indicator.

A control may be associated with each point, with the sending of the remote control being carried out, according to the same principle, by transmitting from the central unit the combination of three frequencies corresponding to the call of the point. A remote control call is discriminated from a data call by sending signals of much longer duration. The operation of the system will be better understood during the description of the various parts of the system.

DESCRIPTION OF A TYPICAL STATION

FIG. 2 shows a station with which are associated, by way of example, a sensor 25 with a nine-bit digital output, a sensor 26 with an analog output, a group 27 of three indicators and a control element 30. The sensors and the indicating group give information on the operation of the industrial process to be controlled, while the control element makes it possible to act directly on this operation. Other sensors, indicators and controls may be associated with such a station. Only one example of each type has been shown in order to simplify the description.

The call line 23 is connected to an input transformer 31, itself connected to a variable-gain amplifier 32 permitting the adjustment of the receiving level. The output of this amplifier is connected to seven bandpass filters 33 to 39 respectively tuned on the frequencies $F_1$, $F_{12}$, $F_3$, $F_5$, $F_7$, $F_9$ and $F_{11}$ for example. Each of these filters is itself composed of two filters in series forming stagger-tuned circuits, thereby providing a greater rejection for a given pass band. The output of each of these filters is connected to full wave detectors 41 to 47 themselves connected to amplifiers 50 to 56. The outputs of the four amplifiers 51, 54, 55 and 56 are connected to an AND gate 57 connected to the active state controls of an inhibit bistable multivibrator 60 and a transmission bistable multivibrator 61, the latter controlling a transmission relay 62. The controls of the passive states of the multivibrators 60 and 61 are connected to the output of the amplifier 50.

The output of the inhibition multivibrator is connected to five 4-input AND gates 63 to 67 of which the other three inputs are connected respectively to the outputs of the amplifiers 54, 55 and 56 for the gate 63; 53, 55 and 56 for the gate 64; 52, 55 and 56 for the gate 65; 53, 54 and 56 for the gate 66; and 52, 54 and 56 for the gate 67. Each gate, which corresponds to a "data point" of the station, controls a response relay respectively 70, 71, 72, 73 and 74. The output of all these relays is connected to a common lead-out conductor 75 connected to the response line 24 through the transmission relay 62, a variable-gain amplifier 76 and an output transformer 77.

The first data point, of which the call combination is determined by the AND gate 63, is associated with the three-indicator group 27. These three indicators control a group of three relays 80 whose inputs are connected to the output of the filters 37, 38 and 39 and whose outputs are connected to a summing circuit 81 itself connected to the response relay 70. The second point is associated with the sensor 26 whose output is frequency modulated by means of a voltage-controlled or current-controlled relaxation oscillator 82, and then applied to the response relay 71. Finally, the last three points are used for the transmission of the nine output bits of the sensor 25. These nine bits, distributed in groups of three, control three relay groups 83, 84 and 85 connected respectively, via three summing circuits 86, 87 and 88, coupled to the relays 72, 73 and 74. The inputs of the relay group 83 are connected to the outputs of the filters 35, 38 and 39; those of the group 84 are connected to the outputs of the filters 36, 37 and 39; and those of the group 85 are connected to the outputs of the filters 35, 37 and 39. The nine bits of the sensor 25 are previously stored in the memory 90 by a transfer control coming from the output of the AND gate 57. The output of the gate 57 also controls an address relay 91 connected to the output conductor 75. This relay makes it possible to send, over the response line, the number of data points actually present in the station. This number is coded in binary form by using the four frequencies $F_7$, $F_9$, $F_{11}$ and $F_{12}$ applied to a summing circuit 92 itself connected to the address relay 91. This number is used in particular when the system operated in the automatic scanning mode. In order to have a transmission of a greater number of frequencies for the small numbers, one may use an inverted 1-2-4-8 code. The coded number received from the station shown in the figure will be 1011 (frequencies $F_7$, $F_9$, $F_{11}$, and $F_{12}$) corresponding to five points.

The output of the AND gate 63 is also connected, via a duration discriminator 93, to a remote control relay 94 which permits a voltage V to be applied to the control element 30.

In operation, if the four frequencies $F_7$, $F_9$, $F_{11}$ and $F_{12}$ corresponding to the address of the station are sent simultaeously on the call line, a pulse appears at the output of the AND gate 57. The leading edge of this pulse triggers the transmission multivibrator 61 into the active state thereby closing the relay 62. The leading edge of this pulse also closes the address relay 91 and transfers into the memory 90 the digital measurement of the sensor 25. The number of points of the station is then sent on the response line. The trailing edge of the pulse coming from the AND gate 57 triggers the multivibrator 60 into the active state thereby removing the inhibition of the five gates 63 to 67 permitting the scanning of the different points of the station. If one then sends the three frequencies $E_7$, $F_9$, and $F_{11}$ over the call line, the AND gate 63 delivers a signal which closes the response relay 70. These frequencies $F_7$, $F_9$ and $F_{11}$ are or are not sent back on the response line depending on the closed or opened condition of the three indicators 27. If the three frequencies $F_5$, $F_9$ and $F_{11}$ were sent, the AND gate 64 closes the relay 71 and the measurement of the sensor 26 is sent frequency-modulated over the response line. Likewise, if the call $F_3$, $F_9$ and $F_{11}$ is sent, the first three bits of the sensor 25 will be sent to the central unit in the form of a combination of 0, 1, 2, or 3 of the frequencies $F_3$, $F_9$, $F_{11}$. The other six bits may be obtained by sending successively the frequencies $F_5$, $F_7$, $F_{11}$ and $F_3$, $F_7$, $F_{11}$.

When all the points of the station have been scanned, a frequency $F_1$ is sent which triggers into the passive state both the multivibrator 61 which disconnects the station from the response line by opening the relay 62, and the multivibrator 60 which inhibits the AND gates 63 to 67 corresponding to all the internal points of the station.

The remote control of the element 30 is carried out by sending over the call line after the address of the station the three frequencies $F_7$, $F_9$ and $F_{11}$ for a much longer duration (500 ms for example) than for the call of a point (a few ms.). The duration discriminator 93 triggers the relay 94 only after a predetermined time, of the order 100 ms, thereby discriminating between the remote control and the call of the point.

It will be noted that with seven filters, and taking into account the fact that the filters 33 ($F_1$) and 34 ($F_{12}$) are used only for the inhibition and the addressing of the station, one can make $C_3^5$ combinations of three frequencies with the five remaining filters, i.e., 10 data point addresses. The maximum capacity of a station is thus 10 data points, or 30 remote indicators and 10 remote controls. Likewise, with the same filters $F_1$, $F_{12}$, $F_3$, $F_5$, $F_7$, $F_9$, $F_{11}$, one can set up 10 stations having different addresses by simply modifying the wiring of the AND gate 57. These addresses are obtained by combining $F_3$, $F_5$, $F_7$, $F_9$ and $F_{11}$, three by three, thereby giving ten different combinations, and by adding the frequency $F_{12}$. Among the 10 channels available at the central unit, (inhibition and address frequencies $F_1$ and $F_{12}$ common to all the stations of course excluded) one can find 10 groups of five which do not have any common combination of three frequencies. This last condition is necessary if one does not wish to encounter two stations of the same address in the system. These six groups can be for example:

TABLE 1

| Groups | Frequencies | | | | |
| --- | --- | --- | --- | --- | --- |
| 1 | $F_3$ | $F_5$ | $F_7$ | $F_9$ | $F_{11}$ |
| 2 | $F_2$ | $F_4$ | $F_6$ | $F_7$ | $F_{11}$ |
| 3 | $F_2$ | $F_3$ | $F_7$ | $F_8$ | $F_{10}$ |
| 4 | $F_2$ | $F_4$ | $F_5$ | $F_9$ | $F_{10}$ |
| 5 | $F_3$ | $F_4$ | $F_6$ | $F_8$ | $F_9$ |
| 6 | $F_{10}$ | $F_5$ | $F_6$ | $F_8$ | $F_{11}$ |

The choice of these six groups was preferred due to the fact that none of them has three consecutive frequencies, thereby reducing the possibility of error which might arise through the transmission of harmonics. Since with each of these six groups it is possible to have 10 stations of different address, it can be seen that the maximum capacity of the system is 60 stations each containing 10 data points. This 10 × 10 × 6 breakdown of the data points makes it possible to simplify the coding of the addresses since it is possible to designate the address of a data point by a three-digit decimal number, the hundreds digit representing one of the six combinations of five frequencies, the 10 digit the combination of the three frequencies among these five which, when added to $F_{12}$, represents the address of the station, and the units digit the combination of three frequencies representing the call of the point within a station. Such a simplification, of little importance if the system is computer-controlled, becomes appreciable for the remote controls or the scanning of data points in manual operation, in which case the operator can use the decimal system with which he is familiar.

DESCRIPTION OF THE CENTRAL UNIT

Referring to FIG. 3, the central unit is composed of a transmission subsystem 100, a receiving subsystem 101 and a storage section of conventional form which may be regarded as peripheral and will not be further described. The transmission subsystem 100 is used to send the addresses of the stations and the points, coded in the form of a combination of frequencies, and includes a transmitter 102 consisting mainly of 12 oscillators connected to the call line by analog gates controlled by coding signals. These signals, chopped by a timing module 104, are elaborated by a coding module 103 from a given address furnished either by a manual control 106 or by an automatic scanning module 107, or by a computer which can be connected via an interface 108. A remote control desk 110, connected to a remote control module 111, acting on the coding module 103 and the timing module 104 makes it possible to generate appropriate coding signals.

In the receiving subsystem 101, the response line 24 is connected to a dispatching circuit 112 which differentiates the analog responses from the digital responses received in the form of a combination of frequencies. The analog responses are applied to an analog receiver 113 composed essentially of a period meter and a digital switch. The frequency thus measured is applied, after a scale change 114, to a buffer memory 115. The digital responses having the form of frequency combinations are decoded in a decoding circuit 116 then applied to a buffer memory 117.

DESCRIPTION OF TRANSMISSION-TIMING SYSTEM

FIG. 4 shows in greater detail the timing module 104 and the transmitter 102 of FIG. 3. The transmitter 102 is composed essentially of 12 oscillators 120 to 131 synchronized by time base signals 105 generated by, for example a crystal oscillator. By way of example, the 12 frequencies chosen may be between 480 Hz and 3,120 Hz and spaced 240 Hz apart. The outputs of these oscillators are connected, via 12 analog gates 132 to 143, to a summing circuit 144 itself connected to the call line 23 via an amplifier 145 and a transformer 146. The analog gates are made passing by 12 coding signals $K_1$ to $K_{12}$ generated by a coding module 103 and applied via 12 AND gates 148 to 159 which receive a common timing signal from the time base 105.

DESCRIPTION OF THE CODING SYSTEM

The coding signals $K_1$ to $K_{12}$ determine the addresses of the stations and the data points. The signals $K_1$ and $K_{12}$ control the respective transmission of the inhibit ($F_1$) and address ($F_{12}$) frequencies. The 10 remaining signals $K_2$ to $K_{11}$ are thus arranged in groups of three in the coding module 103. To call a data point whose position may be represented by a three-digit decimal number, it is necessary to generate a first combination of four signals including $K_{12}$ and three signals at the outputs $K_2$ to $K_{11}$ (for the address of the station) and a second combination of three signals at the outputs $K_2$ to $K_{11}$ for the address of the point within this station.

In fact the input of the coding module is expressed in binary-coded decimal notation, thereby making it possible to admit an address furnished in binary notation by a computer by slightly modifying the wiring. The manual control is obtained by means of ten-position switches giving an address directly in conventional binary-coded decimal notation. The address thus appears in the form of 11 bits, four for the units, four for the tens and three for the hundreds, which may come from the manual control, the automatic scanning or the computer.

Referring to FIG. 5, the input of the coding module 103 consists of eleven OR gates 161 to 171 each receiving an output M from the manual control 106, an output A from the automatic scanning module 107, and an output C from the computer 108. The outputs of these OR gates are applied to three binary-coded-decimal to decimal decoders 172, 173 and 174. The decoders 172 and 173 each have 10 outputs, while the decoder 174 only has six. These 26 outputs are applied to the storage section for noting the data, and are also added one by one to the 26 outputs of the remote control module 111 through 26 OR gates 175 to 200.

The outputs of the ten OR gates 175 to 184 or the outputs of the units $U_0$ to $U_9$ are applied to a "three-out-of-five coder" 201 and the outputs of the 10 OR gates 185 to 194 or tens outputs $D_0$ to $D_9$ to another "three-out-of-five coder" 202. These two coders, of identical form, each have five outputs $A_1$ to $A_5$ or $B_1$ to $B_5$ and carry out the logic function given by the following table:

TABLE 2

| $U_0$ | $U_1$ | $U_2$ | $U_3$ | $U_4$ | $U_5$ | $U_6$ | $U_7$ | $U_8$ | $U_9$ |   | $A_1$ | $A_2$ | $A_3$ | $A_4$ | $A_5$ |
|---|---|---|---|---|---|---|---|---|---|---|---|---|---|---|---|
| 1 | 0 | 0 | 0 | 0 | 0 | 0 | 0 | 0 | 0 | → | 0 | 0 | 1 | 1 | 1 |
| 0 | 1 | 0 | 0 | 0 | 0 | 0 | 0 | 0 | 0 | → | 0 | 1 | 0 | 1 | 1 |
| 0 | 0 | 1 | 0 | 0 | 0 | 0 | 0 | 0 | 0 | → | 1 | 0 | 0 | 1 | 1 |
| 0 | 0 | 0 | 1 | 0 | 0 | 0 | 0 | 0 | 0 | → | 0 | 0 | 1 | 0 | 1 |
| 0 | 0 | 0 | 0 | 1 | 0 | 0 | 0 | 0 | 0 | → | 0 | 1 | 1 | 1 | 1 |
| 0 | 0 | 0 | 0 | 0 | 1 | 0 | 0 | 0 | 0 | → | 1 | 1 | 0 | 0 | 1 |
| 0 | 0 | 0 | 0 | 0 | 0 | 1 | 0 | 0 | 0 | → | 0 | 1 | 0 | 1 | 1 |
| 0 | 0 | 0 | 0 | 0 | 0 | 0 | 1 | 0 | 0 | → | 1 | 0 | 1 | 1 | 0 |
| 0 | 0 | 0 | 0 | 0 | 0 | 0 | 0 | 1 | 0 | → | 1 | 1 | 0 | 1 | 0 |
| 0 | 0 | 0 | 0 | 0 | 0 | 0 | 0 | 0 | 1 | → | 1 | 1 | 1 | 0 | 0 |

Such a coder 201 shown in FIG. 6 consists of five, four-input NOR gates 203 to 207. The four inputs of gate 203 are connected to the outputs $U_0$, $U_1$, $U_3$, and $U_6$; those of gate 204 are connected to outputs $U_0$, $U_2$, $U_4$ and $U_7$; those of gate 205 are connected to outputs $U_1$, $U_2$, $U_5$ and $U_8$; those of gate 206 are connected to outputs $U_3$, $U_4$, $U_5$ and $U_9$ and those of gate 207 are connected to outputs $U_6$, $U_7$, $U_8$ and $U_9$. It is immediately apparent that the output $A_1$ of gate 204 will be a "0" if one of the signals $U_0$, $U_1$, $U_3$, $U_6$ is a "1"; output $A_2$ will be "0" if one of the signals $U_0$, $U_2$, $U_4$, $U_7$ is a "1" and so on for the outputs $A_3$, $A_4$ and $A_5$ in accordance with Table 2 above. The outputs of the five gates 203 to 207 are applied to five AND gates 208 to 212 which may be inhibited or enable all together by the signal $K_{12}$.

Referring again to FIG. 5, the logic sums: $E_1 = A_1 + B_1$, $E_2 = A_2 + B_2$, $E_3 = A_3 + B_3$, $E_4 = A_4 + B_4$ and $E_5 = A_5 + B_5$ are carried out by five OR gates 213 to 217, with the signals $E_1$, $E_2$, $E_3$, $E_4$, and $E_5$ being applied to a "three-out-of-ten coder" 220. This coder 220 has 10 outputs $K_2$ to $K_{11}$ and 12 additional inputs of which six are the signals of the hundreds $C_0$ to $C_5$ and the other six are the inverses of these same signals $\overline{C_0}$ to $\overline{C_5}$ obtained by means of six NOR gates 221 to 226. The other two signals $K_1$ and $K_{12}$ are obtained directly by the manual or automatic controls. It will be noted that the signal $K_{12}$ inhibits the coder 201 and enables the coder 202 or vice versa, this signal being inverted before the units coder 201 by means of the NOR gate 227.

The signals of the "three-out-of-ten coder" 220 are shown in FIG. 7. The hundreds signals $C_0$ to $C_5$ are used to select one of the six groups of five frequencies mentioned in the Table 1 above. Depending on the signals $C_0$ to $C_5$, the coder 220 routes the five inputs $E_1$ to $E_5$ so that they come out on $K_3$, $K_5$, $K_7$, $K_9$, $K_{11}$ if $C_0$ is a "1," on $K_2$, $K_4$, $K_6$, $K_7$, $K_{11}$ if $C_1$ is a "1," on $K_2$, $K_3$, $K_7$, $K_8$, $K_{11}$ is $C_2$ is a "1" and so on in accordance with the Table 1 above. By examining this table one sees that each signal E has to appear only on three different outputs K. For example, $E_1$ has to appear only at $K_2$, $K_3$ and $K_{10}$. The coder 220 thus has 15 AND gates 230 to 244. The signal $E_1$ is applied to an input of the three gates 230 to 232, the signal $E_2$ to an input of the three gates 233 to 235, the signal $E_3$ to an input of the gates 236 to 238, the signal $E_4$ to an input of the gates 239 to 241, and the signal $E_5$ to an input of the gates 242 to 244. The signals $K_2$, $K_4$, $K_6$, $K_8$ and $K_{11}$ are taken directly at the respective outputs of the gates 230, 233, 236, 239 and 242. The outputs of the gates 231 and 235 are applied to an OR gate 246 giving the signal $K_3$. The outputs of the gates 234 and 238 are applied to an OR gate 247 giving the signal $K_5$. The outputs of the gates 237 and 241 are applied to an OR gate 248 giving the signal $K_7$. The outputs of the gates 240 and 244 are applied to an OR gate 249 giving the signal $K_9$. And the outputs of the gates 232 and 243 are applied to the OR gate 250 giving the signal $K_{10}$. The AND gates 230, 233, 236, 239 and 242 have four inputs, the other three inputs of each of these gates being connected respectively to $\overline{C_0}\,\overline{C_4}\,\overline{C_5}$, $\overline{C_0}\,\overline{C_2}\,\overline{C_5}$, $\overline{C_0}\,\overline{C_2}\,\overline{C_3}$, $\overline{C_0}\,\overline{C_1}\,\overline{C_3}$, and $\overline{C_2}\,\overline{C_3}\,\overline{C_4}$. Furthermore, the logic sums $C_0 + C_4$, $C_0 + C_5$, $C_0 + C_2$, $C_0 + C_3$ are carried out by five OR gates 251 to 255 then applied respectively to the AND gates 231, 234, 237, 240 and 243. Finally, the second inputs of the AND gates 232, 235, 238, 241 and 244 are connected respectively to $C_5$, $C_2$, $C_3$, $C_1$ and $C_4$. It can thus be seen that if, for example $C_0$ is a "1", $C_1$, $C_2$, $C_3$, $C_4$, $C_5$ obviously being "0's the only AND gates enabled will be the gates 231, 234, 237, 240 and 242 and the signals $E_1$ to $E_5$ will come out at $K_3$, $K_5$, $K_7$, $K_9$, $K_{11}$. Likewise one obtains the five other combinations from Table 1 by successively giving $C_1$, $C_2$, $C_3$, $C_4$, $C_5$ the value "1."

DESCRIPTION OF AUTOMATIC SCANNING SYSTEM

The automatic scanning module 107 shown in detail in FIG. 8 consists of an 11-bit decimal counter formed by a units element 260, a tens element 261 and a hundreds element 262. The outputs of the elements 261 and 262 are connected to a wired comparator 263 which resets these two elements when the total number of stations is reached. The number of data points contained in a station is received in the form of four bits coming from the receiving subassembly 101. This number of points is stored in a memory 264 and compared with the value given by the units element 260 in a comparison circuit 265. When this value becomes equal to the number of points, the comparison circuit delivers a pulse which brings the element 260 to a value (15) immediately preceding its value (0). The output pulse of the comparison circuit also delivers a station inhibit signal $K_1$ applied to the coding module 103 and advances the tens element 261. The advance of this element 261 may be eliminated by opening a switch 266. A scan is then made of all the points of a given station, the address of the station remaining unchanged.

When the element 260 is in the position (15), a signal $K_{12}$ is transmitted and the address of a station is sent out. This signal (15) is also used, via a delay circuit 267, for transferring into the memory 264 the signals received corresponding to the number of data points of the station.

The units element is supplied by clock pulses coming from a time base 105 and a applied via an AND gate 268. The other input of this AND gate is connected to the output of a NOR gate 270 having three inputs capable of receiving three signals which block the arrival of clock pulses, thereby stopping the counter. One of these signals MB is a manual block capable of being controlled by the operator. Another one of these signals ECB (end-of-cycle block) comes from the comparator 263 and stops the counter when the total number of stations is reached, the system having been scanned completely. This block may be eliminated by opening a switch 271 when one wishes to repeat the cycle. Finally the third blocking signal AL (alarm) appears when a station does not respond to an address signal, thereby permitting the defective station to be indicated. This signal AL is taken at the output of a NOR gate 272 at the input of which is applied the coded number of data points of a station, this coded number being taken at the output of the memory 264.

Summarizing, the scanning module 107 can operate in three modes: manual mode which repeats the address of a data point, semi-automatic mode which scans all the points of a given station, and the automatic mode which scans all the station of the system.

DESCRIPTION OF REMOTE CONTROL SYSTEM

FIG. 9 shows the remote control desk 110 and module 111. Remote controls are performed by pushbuttons placed on the desk 110 which has a decimal output, i.e., consisting of 10 units wires, 10 tens wires and 6 hundreds wires connected to three memories 273 to 275, themselves connected to the coding module 103. The six outputs of the memory 275 are applied to a NOR gate 276 connected to an AND gate 277 which also receives an output of the desk 110. This AND gate is connected to the input of a monostable multivibrator 278 of 10 ms duration. Three other monostable circuits 280, 281 and 282, giving pulses of respective durations of 10 ms, 500 ms and 10 ms, are connected in series to the output of the multivibrator 278. The output of the multivibrator 278 delivers the signal $K_1$ and the transfer signal $T_R$ applied to the memories 273 to 275. The outputs of the multivibrators 280 and 281 respectively deliver the signals $K_{12}$ and the timing signals. The output of the multivibrator 282 again delivers the signal $K_1$ and a reset signal applied to the memories. The multivibrators 280 and 281 may be inhibited by the alarm signal AL. The outputs of these multivibrators 280 and 281 are also applied to an OR gate 281 which delivers an inhibit signal for the desk 110 and the data storage subassembly.

In operation, the act of depressing a pushbutton forms an address and triggers the monostable multivibrator 278 which transfers this address into the memory and inhibits all the stations by means of the signal $K_1$. The multivibrator 280 then sends, for 10 milliseconds, the address of the station which sends back in coded form the number of data points it contains. In case of no response, the multivibrators 280 and 281 are inhibited and the remote control proper is not sent. In the opposite case, the multivibrator 281 sends, for 0.5 seconds, the address of the point of the station which triggers the control element corresponding to this address. The multivibrator 282 then inhibits the stations (signal $K_1$) and resets the memories. It will be noted that if the memory 275 is not reset, the AND gate 277 is blocked and no signal may be applied to the multivibrator 278. Moreover, all the pushbuttons are inhibited throughout the duration of the pulses of the multivibrators 280 and 281 thereby preventing simultaneous controls.

DESCRIPTION OF A RECEIVING SUBSYSTEM

Referring to FIG. 10 the response line 24 is connected, via an input transformer 285 and a variable-gain amplifier 286, to a dispatching circuit 287 which directs the digital and analog data onto different channels. This dispatching may be controlled, for example, by the addresses of the points by systematically assigning the remote analog measurements to the first data points of each station.

After shaping in a circuit 290, the analog data is applied to an analog receiver 291 consisting of a period meter of which the result is inverted so as to restore in digital form a magnitude proportional to the frequency. Such a receiver may be of the type described in U.S. Pat. application, Ser. No. 714,267 filed on Mar. 19, 1968 under the title of "Digital Frequency Meter." Scale changes 292 permit direct processing of the measurement applied to a buffer register 293 and then to the storage section associated with the receiving subassembly 101.

At the output of the dispatching circuit 287, the digital data, remote indications for example, are applied to 11 filters 299 to 309 and then to 11 full wave detectors 310 to 320. These filters, identical to those of the stations, are tuned to the frequencies $F_2$ to $F_{12}$, respectively, the frequency $F_1$ obviously being excluded. The outputs of the detectors are applied to 11 two-input AND gates 321 to 331, the second inputs receiving the signals $K_2$ to $K_{12}$ delivered by the coding module 103 (FIG. 5). The outputs $R_2$ to $R_{11}$ of the AND gates 322 to 331 are applied to a "five-out-of-ten decoder" 332 connected to a "three-out-of-five decoder" 333 having three outputs $T_1$ to $T_3$ kept in three buffer registers 334 to 336 before being applied to the storage section. The output $R_{12}$ of the AND gate 321 and the outputs $T_1$, $T_2$, $T_3$ of the decoder 333 are also connected to the remote control module 111 and to the automatic scanning module 107.

From among the ten outputs $R_2$ to $R_{11}$ of the AND gates 322 to 331, only three may be active simultaneously. The role of the decoders 332 and 333 is to route these three outputs which may be active onto $T_1$, $T_2$ and $T_3$. The first step carried out by the "five-out-of-ten decoder" 332 makes it possible to route onto five outputs $S_1$ to $S_5$ the only five signals out of $R_2$ to $R_{11}$ capable of being received from a given station, these five signals corresponding to the five filters of this station apart from $F_1$ and $F_{12}$. It was seen that the selection of the groups of five frequencies was obtained by means of the hundreds signals $C_0$ to $C_5$ of the coding module 103. Thus for this first decoding these signals $C_0$ to $C_5$ are used. More exactly, as the inverses of these signals are available, one uses $C_1$ to $C_5$ and $\bar{C}_1$ to $\bar{C}_5$, $C_0$ and $\bar{C}_0$ not being necessary. The decoder 332, shown in FIG. 11, includes 10 two-input AND gates 340 to 349 and five, three-input OR gates 350 to 354. The signals, $R_2$, $R_4$, $R_6$, $R_8$ and $R_{11}$ are directly applied respectively to the OR gates 350 to 354. The signal $R_3$ is applied to the AND gates 340 and 341, the signal $R_5$ to the gates 342 and 343, the signal $R_7$ to the gates 344 and 345, the signal $R_9$ to the gates 346 and 347, and the signal $R_{10}$ to the gates 348 and 349. The second inputs of the gates 340 to 349 receive respectively the signals $\bar{C}_2$, $C_2$, $\bar{C}_3$, $C_3$, $\bar{C}_1$, $C_1$, $\bar{C}_4$, $C_4$, $C_5$, $\bar{C}_5$. The outputs of the AND gates 340 and 348 are connected to the other two inputs of the OR gate 350. Likewise, the gates 341 and 342 are connected to the OR gate 351, the gates 343 and 344 to the OR gate 352, the gates 345 and 346 to the OR gate 353 and the gates 347 and 349 to the OR gate 354.

One sees that, depending on the value of the signals $C_1$ to $C_5$, the signals $R_2$ to $R_{11}$ which may appear, are applied differently at $S_1$, $S_2$, $S_3$, $S_4$, $S_5$, according to the table below:

TABLE 3

| $C_0$ $C_1$ $C_2$ $C_3$ $C_4$ $C_5$ | $S_1$ | $S_2$ | $S_3$ | $S_4$ | $S_5$ |
|---|---|---|---|---|---|
| 1 0 0 0 0 0 | $R_2$ +$R_3$ | $R_4$ +$R_5$ | $R_6$+$R_7$ | $R_8$+$R_9$ | $R_{10}$+$R_{11}$ |
| 0 1 0 0 0 0 | $R_2$ +$R_3$ | $R_4$ +$R_5$ | $R_6$ | $R_7$+$R_8$ +$R_9$ | $R_{10}$+$R_{11}$ |
| 0 0 1 0 0 0 | $R_2$ | $R_3$ +$R_4$ +$R_5$ | $R_6$+$R_7$ | $R_8$+$R_9$ | $R_{10}$+$R_{11}$ |
| 0 0 0 1 0 0 | $R_2$ +$R_3$ | $R_4$ | $R_5$+$R_6$ +$R_7$ | $R_8$+$R_9$ | $R_{10}$+$R_{11}$ |
| 0 0 0 0 1 0 | $R_2$ +$R_3$ | $R_4$ +$R_5$ | $R_6$+$R_7$ | $R_8$ | $R_9$+$R_{10}$ +$R_{11}$ |
| 0 0 0 0 0 1 | $R_{10}$ +$R_2$ +$R_3$ | $R_4$ +$R_5$ +$R_3$ | $R_6$+$R_7$ | $R_8$+$R_9$ | $R_{11}$ |

Since, for a given combination $C_0$ to $C_5$, the received signals $R_2$ to $R_{11}$ can only be found among five frequencies listed in Table 1, two simultaneous signals cannot appear at one of the outputs $S_1$ to $S_5$ and only the signals underlined in the Table 3 can be present at these outputs. Thus, the signals $R_2$ to $R_{11}$ capable of being received have been brought onto five outputs.

Out of these five signals $S_1$ to $S_5$ only three may appear simultaneously, all combinations of three out of these five being possible. The second phase of the decoding, consisting of bringing these five signals $S_1$ to $S_5$ onto three outputs $T_1$ to $T_3$, is achieved in the "three-out-of-five decoder" 333 shown in FIG. 12. This decoder 333 makes it possible, through the use of the signals $E_1$ to $E_5$ from the coding module 103, to arrange in increasing order the three signals out of the $S_1$ to $S_5$ which may appear. The signals $E_1$, $E_2$, $E_4$, $E_5$ ($E_3$ not being necessary) are first of all applied to four NOR gates 356 and 359 which give the inverses $\bar{E}_1$, $\bar{E}_2$, $\bar{E}_4$ and $\bar{E}_5$. The signal $S_2$ is applied to two AND gates 360 and 361, the signal $S_3$ to three AND gates 362, 363, 364 and the signal $S_4$ to two AND gates 365 and 366. The two-input AND gates 360, 361 365 and 366, moreover receive respectively the signals $\bar{E}_1$, $E_1$, $E_5$, $\bar{E}_5$. The signals $\bar{E}_1$ and $\bar{E}_2$ are applied to the three-input AND gate 362, the signals $\bar{E}_4$ and $\bar{E}_5$ being applied to the three-input AND gate 364. The AND gate 363 receives the signals $(\bar{E}_1 + \bar{E}_2)$ and $(\bar{E}_4 + \bar{E}_5)$ obtained respectively through two OR gates 367 and 378. Three, three-input OR gates 370, 371 and 372 have outputs $T_1$, $T_2$ and $T_3$. The gate 370 is connected to $S_1$ and to the outputs of the AND gates 360 and 362; the gate 371 is connected to the outputs of the AND gates 361, 363 and 365; and the gate 372 is connected to $S_5$ and to the outputs of the AND gates 364 and 366.

One sees that the decoder 333 achieves the following logic functions:
$T_1 = S_1 + S_2 \bar{E}_1 + S_3 \bar{E}_1 \bar{E}_2$
$T_2 = S_2 E_1 + S_3 (\bar{E}_1+\bar{E}_2)(\bar{E}_4+\bar{E}_5) + S_4 E_5$
$T_3 = S_5 + S_4 \bar{E}_5 + S_3 \bar{E}_4 \bar{E}_5$ In other words, the signal appearing at $T_1$ will be $S_1$ or $S_2$ if $E_1$ is zero (in which case $S_1$ will of necessity be zero), or $S_3$ if $E_1$ and $E_2$ are zero at the same time ( in which case $S_1$ and $S_2$ will of necessity be zero). Likewise, the signal appearing at $T_3$ will be $S_5$, or $S_4$ if $E_4$ and $E_5$ are zero at the same time (in which case $S_4$ and $S_5$ will be necessity be zero). Finally, the signal appearing at $T_2$ will be $S_2$ if $E_1$ is not zero, or $S_3$ if at the same time one of the two signals $E_1$, $E_2$ and one of the two signals $E_4$, $E_5$ are zero, or $S_4$ if $E_5$ is not zero. Supposing that three signals appear simultaneously at $S_1$ – $S_5$, which is the maximum possible, these three signals will always be found at $T_1$, $T_2$, $T_3$ arranged in increasing order $S_1 \rightarrow S_5$ from the left to right.

The data transmission system described above uses combinations of three or four frequencies chosen out of 12 possible channels. It is evident that the addresses of the stations and the call of the points could comprise a different number of signals, but the number of frequencies used for one address must be greater than the number used for the call of the point. It is possible for example to form the address of a station by transmitting three signals and the call of a point by transmitting two signals. Likewise, it is not necessary to have an address channel common to all stations; all the address signals can be chosen from among the channels used for the call of the points. The number of filters of a station chosen in the example above to permit the grouping of 10 data points may obviously be modified taking into account the geographical spacing of the measurement points of the industrial installation.

What is claimed is:

1. A system for accessing plural groups of data points, each group of data points being located at different stations, comprising: a central unit including a transceiver apparatus common to all stations for transmitting and receiving electrical signal frequencies, means coupled to the signal input of each station for discriminating between a particular combination of ($n + 2$) signal channels selected from a greater number N of signal channels allocated to said central unit, said transceiver apparatus including a transmitter circuit for transmitting to all of said stations combinations of ($p + 1$) channel signals selected from said N channels and for subsequently transmitting thereto at least one combination of $p$ channel signals selected from the n channel signals assigned to said one station: first selecting means at each station responsive to one predetermined combination of ($p + 1$) signals for causing said one station to receive said at least one combination of $p$ channel signals, second selecting means at each station responsive to said at least one combination of $p$ signals so as to select a certain data point in said one station; said transceiver apparatus also including a receiver circuit for signals transmitted by the selected data point, and a second transceiver apparatus at said data point for transmitting information to said receiver circuit in response to said $p$ channel signals, wherein the information transmitted by said second transceiver of the selected data point to said receiver circuit is a frequency-modulated electrical signal representative of a parameter measured by that point, and means coupled to said receiver circuit for converting said frequency-modulated signal into a representative digital signal.

2. A system for accessing plural groups of data points, each group of data points being located at different stations, comprising: a central unit including a transceiver apparatus common to all stations for transmitting and receiving electrical signal frequencies, means coupled to the signal input of each station for discriminating between a particular combination of ($n + 2$) signal channels selected from a greater number N of signal channels allocated to said central unit, said transceiver apparatus including a transmitter circuit for transmitting to all of said stations of ($p + 1$) channel signals selected from said N channels and for subsequently transmitting thereto at least one combination of $p$ channel signals selected from the n channel signals assigned to said one station; first selecting means at each station responsive to one predetermined combination of ($p + 1$) signals for causing said one station to receive said at least one combination of $p$ channel signals, second selecting means at each station responsive to said at least one combination of $p$ signals so as to select a certain data point in said one station; said transceiver apparatus also including a receiver circuit for signals transmitted by the selected data point, and a second transceiver apparatus at said data point for transmitting information to said receiver circuit in response to said $p$ channel signals, wherein said second transceiver of the selected data point transmits information in digital form to said receiver circuit, means coupled to said receiver circuit for translating the digital information into binary-coded form, and a memory unit coupled to the translating means for storing the binary information at a memory address corresponding to the location of the data point from which the information is received.

3. A system for accessing plural groups of data points, each group of data points being located at different stations, comprising: a central unit including a transceiver apparatus common to all stations for transmitting and receiving electrical signal frequencies, means coupled to the signal input of each station for discriminating between a particular combination of ($n + 2$) signal channels selected from a greater number N of signal channels allocated to said central unit, said transceiver apparatus including a transmitter circuit for transmitting to all of said stations combinations of ($p + 1$) channel signals selected from said N channels and for subsequently transmitting thereto at least one combination of $p$ channel signals selected from the n channel signals assigned to said one station; first selecting means at each station responsive to one predetermined combination of ($p + 1$) signals for causing said one station to receive said at least one combination of $p$ channel signals, second selecting means at each station responsive to said at least one combination of $p$ discriminated signals so as to select a certain data point in said one station; said transceiver apparatus also including a receiver circuit for signals transmitted by the selected data point, and a second transceiver apparatus at said data point for transmitting information to said receiver circuit in response to said $p$ channel signals, wherein conductor means connects said transceiver apparatus to all of said stations, and wherein the addressed data points receive and transmit by means of said conductor.

4. A system for accessing plural groups of data points, each group of data points being located at different stations, comprising: a central unit including a transceiver apparatus common to all stations for transmitting and receiving electrical signal frequencies, means coupled to the signal input of each station for discriminating between a particular combination of ($n + 2$) signal channels selected from a greater number N of signal channels allocated to said central unit, said transceiver apparatus including a transmitter circuit for transmitting to all of said stations combinations of ($p + 1$) channel signals selected from said N channels and for subsequently transmitting thereto at least one combination of $p$ channel signals selected from the $n$ channel signals assigned to said one station first selecting means at each station responsive to one predetermined combination of ($p + 1$) signals for causing said one station to receive said at least one combination of $p$ signals so as to select a certain data point in said one station; said transceiver apparatus also including a receiver circuit for signals transmitted by the selected data point, and a second transceiver apparatus at said data point for transmitting information to said receiver circuit in response to said $p$ channel signals, wherein the means coupled to the input of each station comprises ($n + 2$) number of filters.

5. The system according to claim 4 wherein each station comprises: seven of said filters tuned to seven of the N channels, an address gate coupled to receive the output of said seven filters, bistable means for selectively transmitting signal to the data points of the station, said address gate when enabled triggering said bistable means to a signal transmitting mode thereby permitting signal translation to the data points.

6. The system according to claim 5 wherein each data point includes a call gate coupled to receive the output of three of said seven filters, said call gate being enabled by said bistable means in said transmitting mode and producing an output signal when enabled, said second transceiver apparatus responsive to said output signal for transmitting data point information to said receiver of said control unit.

7. The system according to claim 6 which further comprises, N oscillators for generating said N frequency channels, N analog gates coupled to the outputs of different ones of said oscillators, ($p$+1) of said analog gates being enabled by the transmission of the address signal of a station and p of said analog gates being enabled by the call of the data point.

8. A method for selectively acquiring at a central electrical signal transmitting and receiving station information obtainable from groups of data sources in electrical communication with different ones of plural substations, the substations also being in electrical communication with the central station, comprising the steps of: assigning each substation a number ($n + 2$) of predetermined signal channels selected from a larger number N of signal channels allocated to the central station, transmitting from said central station ($p + 1$) number of signals selected from said ($n + 2$) channels to address a selected one of said substations, and thereafter transmitting from said central station different combinations of p number of signals to address different ones of said data sources in communication with the addressed one of said substations selecting one channel from said ($n + 2$) channels to obtain an address signal channel common to all combinations of ($p + 1$) signals constituting the address signals of the different substations, discriminating at each of said substations between signal translated in the common address channel and signals translated in other channels, selecting another channel from said ($n + 2$) channels, discriminating at each of said substations between signals translated in said signal inhibiting channel and signals translated in the other channels comprising the ($n + 2$) channels, transmitting data from said addressed data source to said central station, and selecting two of said N channels for said common address and said common inhibiting channels.

9. The method according to claim 8 wherein the respective successive transmissions from the central station of said ($p$+1) signals and said $p$ signals is performed by the steps of, preselecting a group of channels from among the N-2 remaining channels, transmitting signals from the preselected group of channels in combination with a signal from said common address channel so as to form ($p$+1) number of address signals, selecting p signals from the same preselected group so as to provide $p$ number of source call signals, and transmitting a call signal to address a data source.

10. The method according to claim 9 which further comprises: assigning three-digit decimal numbers as the address of each data source such that the most significant digit of said number represents said preselected group of channels, the next-to-most significant digit represents a substation address signal, and the least significant digit represents the call signals for data sources in said substation, and storing each of said numbers at said central station.

11. The method according to claim 10 and further comprising: transmitting data from the called data source to the central receiving station, and decoding the received data at the central station.

12. The method according to claim 11 and further comprising: storing the received and decoded data at the central station.

13. The method according to claim 12 and further comprising: automatically transmitting from the central station another call signal upon receiving data from a previously called data source.

14. The method according to claim 9 and further comprising: controlling the operation of an industrial process from one of said data sources operatively associated with said process by, transmitting to the one source p simultaneous signals for a longer time than the call of the source, and discriminating at the one source between the time durations of the p signals and the call to initiate the control of the process.

* * * * *